United States Patent
Alonso et al.

(10) Patent No.: US 6,445,293 B1
(45) Date of Patent: Sep. 3, 2002

(54) VERSATILE CAMERA SYSTEM FOR SECURE DOCUMENT TRANSACTIONS

(75) Inventors: Carlos Alonso, Caracas; Jonathan Bartolotta, San Antonio de Los Altos, both of (VE); Antonio Mugica, Boca Raton, FL (US); Roger Pinate, Caracas (VE)

(73) Assignee: Smartmatics, Inc., Boca Raton, FL (US)

( * ) Notice: Subject to any disclaimer, the term of this patent is extended or adjusted under 35 U.S.C. 154(b) by 0 days.

(21) Appl. No.: 09/682,075

(22) Filed: Jul. 17, 2001

(51) Int. Cl.[7] .............................................. G08B 13/00
(52) U.S. Cl. ..................... 340/541; 340/567; 345/7; 345/9; 348/373; 348/143; 348/232; 348/376; 348/139; 348/150; 348/159; 382/115
(58) Field of Search ................... 340/541, 567; 345/7, 9; 348/373, 143, 232, 230, 376, 139, 150, 159; 382/115

(56) References Cited

U.S. PATENT DOCUMENTS

| | | | |
|---|---|---|---|
| 5,202,724 A | * | 4/1993 | Nagata et al. ................. 355/64 |
| 5,558,232 A | * | 9/1996 | Stevens et al. .............. 209/584 |
| 5,661,283 A | * | 8/1997 | Gallacher et al. ........... 235/379 |
| 5,764,385 A | * | 6/1998 | Ohyama ..................... 358/498 |
| 5,973,730 A | * | 10/1999 | Tranchita et al. ........... 348/143 |
| 6,008,846 A | * | 12/1999 | Uehara et al. .............. 348/373 |
| 6,091,377 A | * | 7/2000 | Kawai ........................... 345/7 |

* cited by examiner

Primary Examiner—Daniel J. Wu
Assistant Examiner—Tai T. Nguyen
(74) Attorney, Agent, or Firm—Jeffrey Furr

(57) ABSTRACT

On the preferred embodiment, this system comprises two video cameras 18 and 20, a document tray 12 performing document detection, an LCD (Liquid Crystal Display) screen 10, a push button 14 for local activations, and an LED indicator 16. The main function and object of this system is to act as a front-end for a video security system able to record documents transactions. This camera system provides compatibility with any existing image storage device capable of storing and managing composite video images. If the main storage system can handle and store composite video images, this camera system is compatible with it and can get any advanced feature shown in the main video system.

2 Claims, 5 Drawing Sheets

Camera system microcontroller's block diagram

Figure 1 -- Camera system, lateral view

Figure 2- Camera System, front view

Figure 3- Camera System, back view

Flowchart of the microcontroller's program

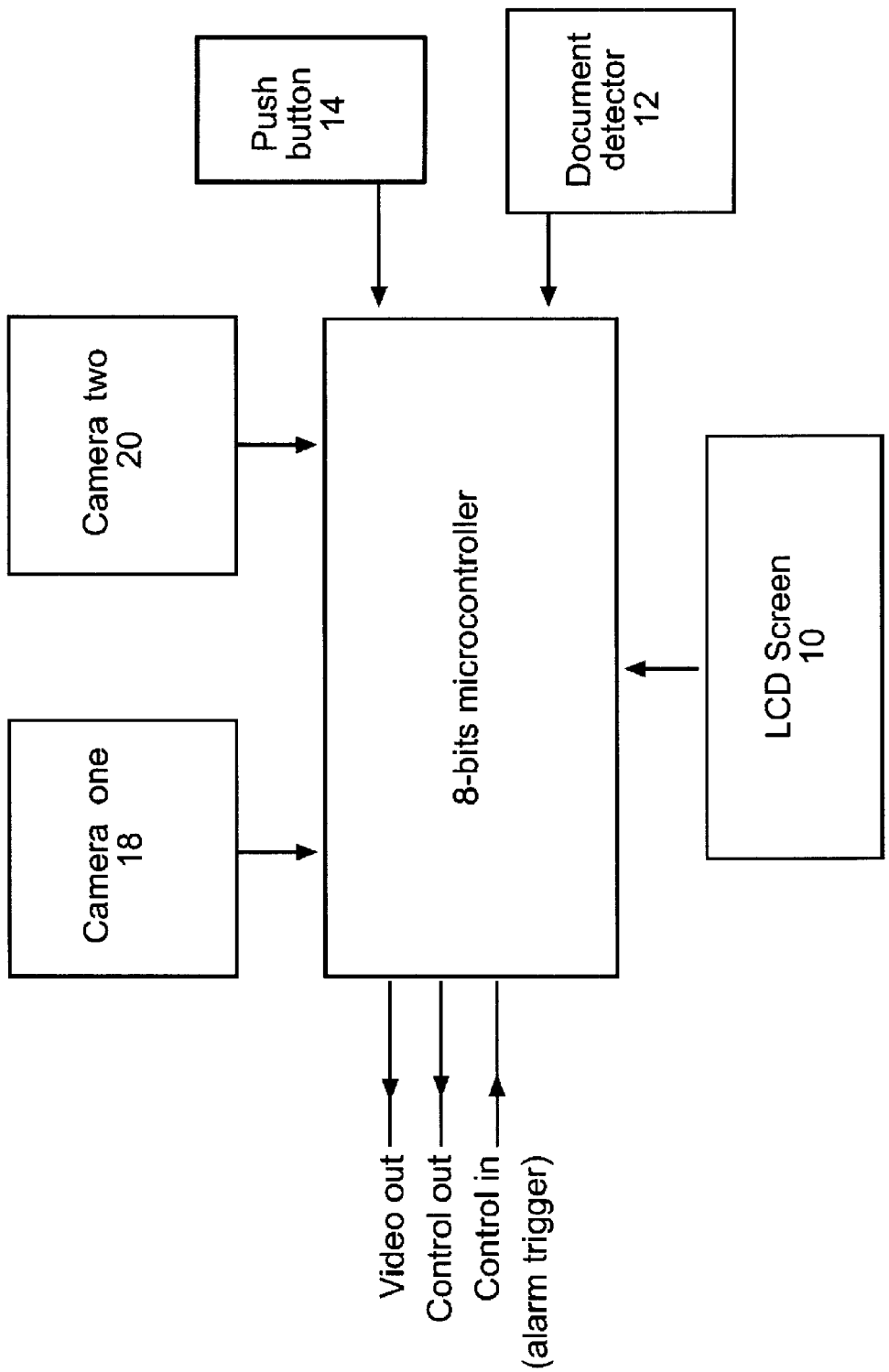
Figure 5 – Camera system microcontroller's block diagram

VERSATILE CAMERA SYSTEM FOR SECURE DOCUMENT TRANSACTIONS

BACKGROUND OF INVENTION

This invention relates to the design and implementation of a video security system for document-related transactions.

BACKGROUND—DISCUSSION OF PRIOR ART

Banking security is one of the most important issues in the security industry. The majority of developments and inventions related to security applications target banking security needs and applications.

Today's banking security is based on video recording and imaging systems. Images are stored on videotape and/or photograph film. Documents and transactions are stored and protected on microfilm. This technology involved on this type of transactions can fail, resulting in an increase in the risk of fraud.

Systems that protect documents and transactions in bank security systems are based on photographic film cameras. These cameras do not have a visor, and the operator must, at best, guess the correct position of the person and document. This may cause errors in the photographs and create a security hole.

Another disadvantage of the actual systems is the storage of photographs. Due to the use of film technology, an operator must process the film to obtain a useful image. In addition, the classification and storage of the images is operator-dependent, prone to human mistakes, resulting in possible loss or misplacing of images. Besides human-dependent operations, image storage is not versatile, since the system is limited to film technology, and thus new types of image storage devices cannot be used with this security appliance.

In case of an emergency, this type of security system cannot react dynamically and cannot be used as an extension of the video system on site, so most visual details of an emergency could be lost.

SUMMARY OF INVENTION

A camera designed for secure document transactions must meet some specifications set for the banking industry, which is the source of document transactions. This type of camera must have the ability to take full-quality pictures of two scenes in sequence or simultaneously (picture-in-picture application). To maximize functionality and versatility, the camera system must support multiple media-storage devices, because the security system may use different types of storage systems.

This camera system may use modern techniques of image storage, with new capabilities and features included in the storage device, including compatibility with older systems. The camera system may inherit the features of the media-storage device, so the security system may be limited only by the storage device. The camera system implements basic functionality and can support all special features of the storage device.

OBJECTS AND ADVANTAGES OF THE INVENTION

The main object of the disclosed camera system is to provide maximum security for document-related transactions. In prior art, security for this type of documents is operator-dependent. Accordingly, several objects of the system are:

a) Versatility: the camera system may be used with multiple storage devices and with multiple security systems from diverse brand names.

b) Easy operation: the present enclosure combines easy operation (no training needed) with possible security feature extensions.

c) Improved security system: External controllability improves the complete security system because the camera system may react dynamically to external events.

The main advantage of the invention over prior attempts is its versatility; this system can correctly operate with any image storage device that supports composite video. Another important feature is the presence of an LCD Screen 10, by which an operator may view the picture before capturing it, thus assisting the storage of correct pictures.

Still another advantage is the document detector. The system may be in a Wait-state and switch to a Ready-state when a document is placed on the document tray 12. This guarantees that the system will take a full pair of pictures, i.e., a person (e.g., bank customer performing transaction) and a document (e.g., personal check being cashed and personal document), only when the document is placed on the document tray.

The versatility of the camera system permits the inheritance of the features of the main storage system, so it can operate in different ways than specified here, showing more features without losing its main target. Naturally, the extra features depend only on the selected storage system. For instance, if the storage system is a digital video recorder, the camera system may capture and store live video that may be used in conjunction with a video surveillance system.

Through dynamic response and interaction with the main security system, this system may interoperate with the main system using dedicated input and output ports. The interaction of the systems depends on the main system's capabilities. The disclosed camera system supports this interaction.

BRIEF DESCRIPTION OF DRAWINGS

FIG. 5 shows a block diagram of the camera system microcontroller. The microcontroller implements intercommunication with the main system and manages the system resources according to the flow chart of FIG. 4.

LIST OF REFERENCE NUMERALS

Figure 1:
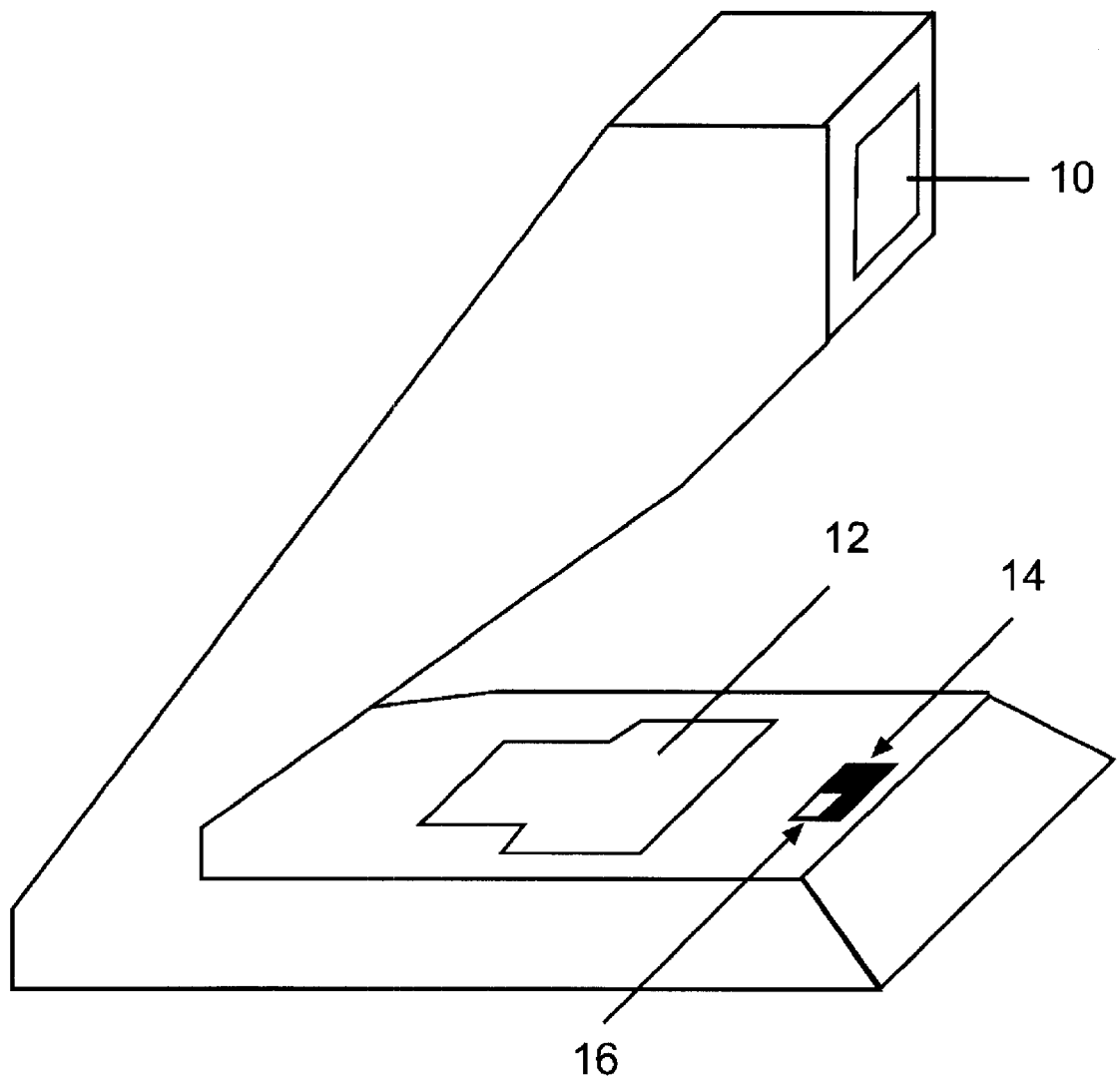
FIG. 1 shows a perspective view of the invention. Notice the document tray 12, the activation button 14, the system indicator 16 and the LCD screen 10.
Figure 2:
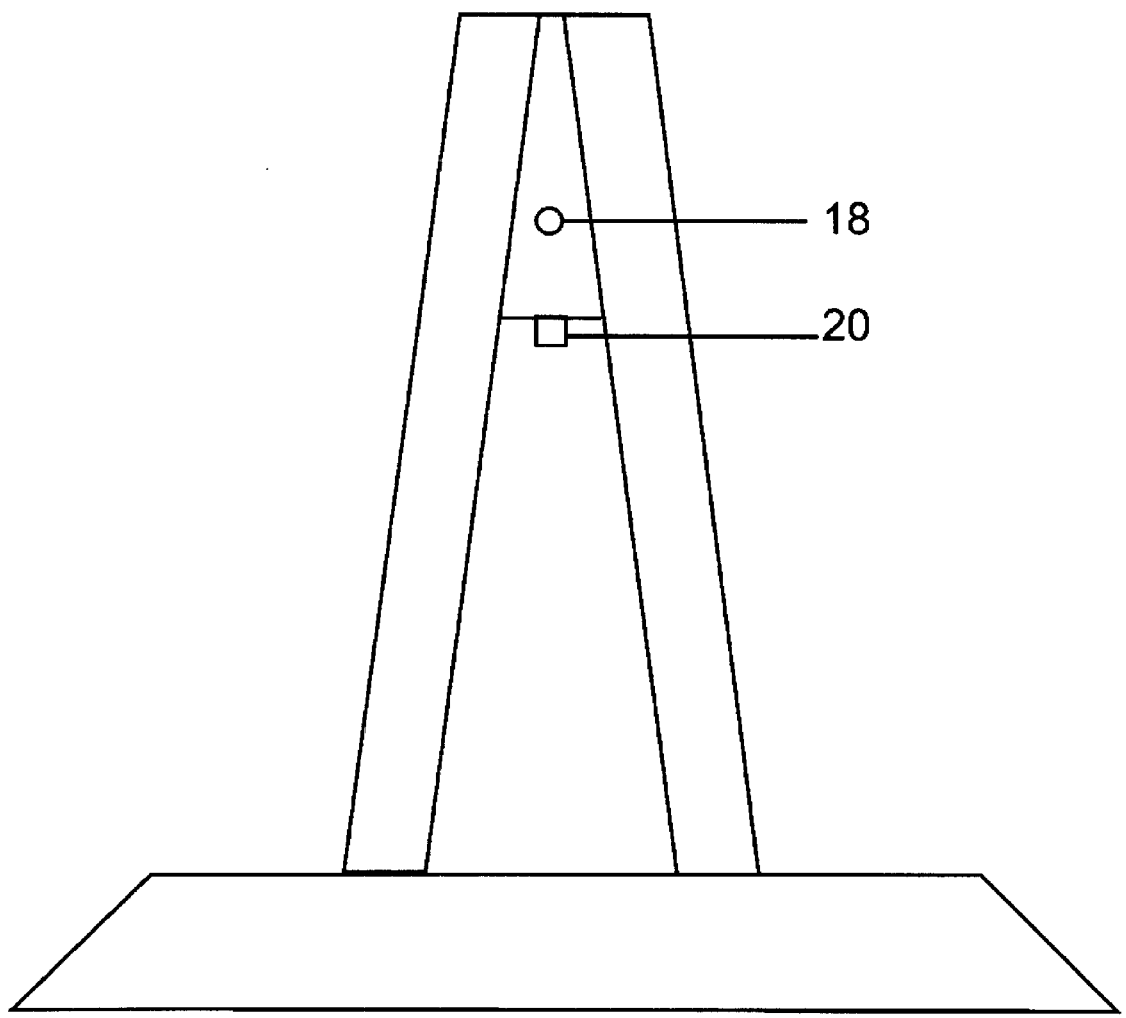
FIG. 2 shows a front view of the invention. This view shows the position of the cameras: one camera 18 points to the front view, the other camera 20 points to the document tray 12.
Figure 3:
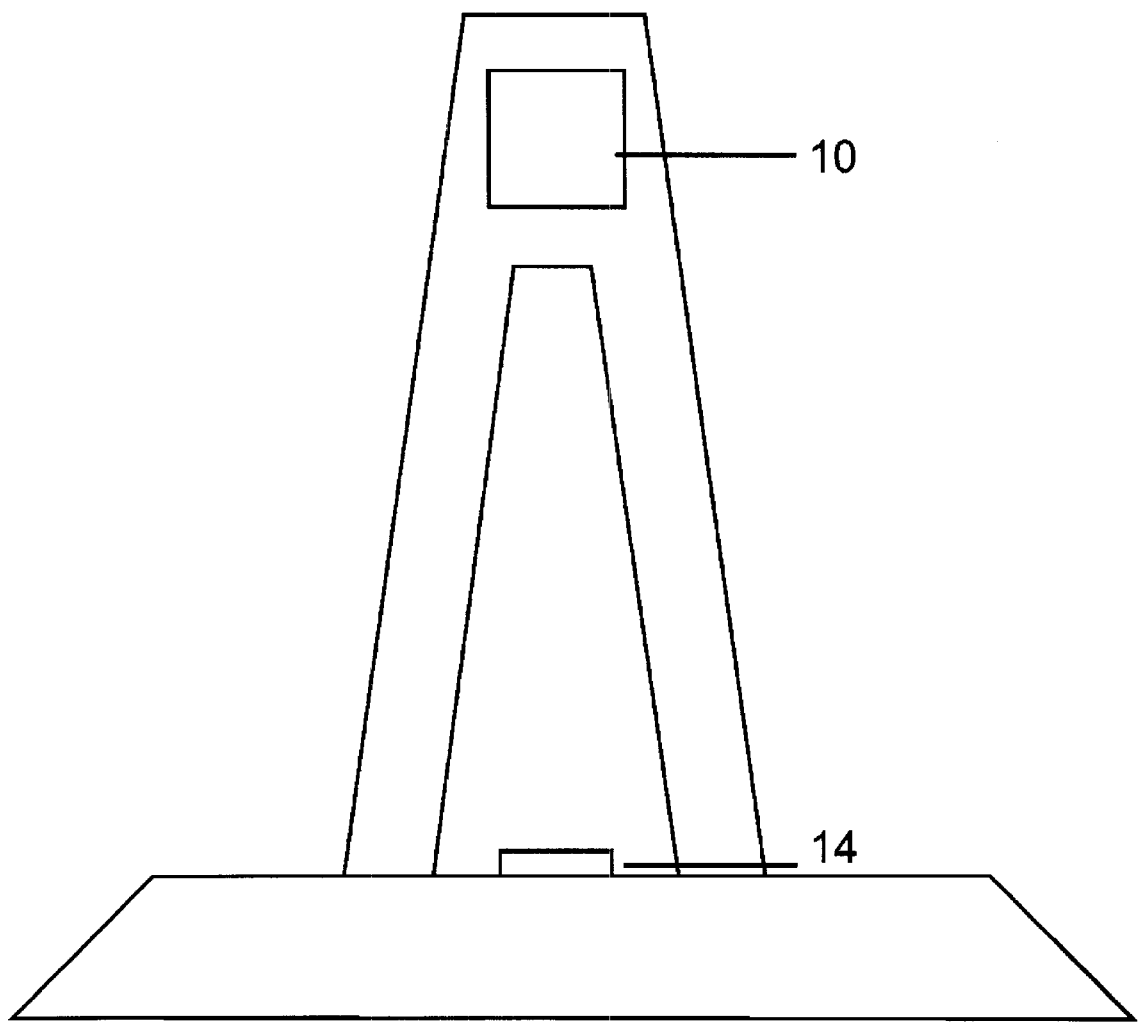
FIG. 3 shows the back view of the invention, detailing where the LCD screen 10 and the activation button 14.

10—LCD display screen
12—Document tray
14—Push button
16—State indicator (LED)
18 First camera
20 Second camera

DETAILED DESCRIPTION

The camera system disclosed in the present invention is based on two video cameras mounted on a structure that allows an operator to focus an image in front of the structure and an image directly below it. This disposition of cameras allows the capture of two images related to one same action and transaction. In the preferred embodiment, the bottom image belongs to a document, while the front image belongs to a person.

The structure has an LCD screen 10 displaying the front image to assist in the correct capture of the front picture. The bottom picture can always be taken correctly because the base of the structure (document tray 12) contains markers that define the picture area. By correctly using these aids, both pictures will always be captured correctly.

The document tray 12 comprises two photosensors (not shown), whose function is to detect the presence of a document so that the system may trigger a "document-in-place" event and switch to the next state of operation.

The camera system can support any storage system that can capture video images, i.e. any storage device that captures video images and stores them in any format. Thus, the camera system can support storage devices based on microfilm, devices based on videotape or computer-based storage devices. The last important features of the full system depend on the storage device. This amount of versatility creates the possibility of using only one type of camera system for virtually any type of storage device. Depending on the selection of storage device, further features are added to the camera system.

The camera system comprises a status indicator 16, which displays the current state of the system. It also comprises an activation button 14, since the main function of the camera is to take pictures of selected images. The activation button may implement some advanced functions, depending on the selected mass storage device.

This camera system may interact with the entire security system through a connector (e.g., RJ-45 connector). Using this connector, the main system may have total control of the camera system, including information exchange and external event triggering.

OPERATION

The camera system is based on an 8-bit microcontroller. This is the heart of the system and implements basic functionality. It comprises four states of operation, which are used by the main system to increase system versatility. These are described next:

Wait state: green LED 16 blinking. The LCD screen in off, the system is waiting for external input. Also called, energy-saving state.

Ready state: green LED 16 turns on. The system is now ready to take pictures, and the LCD screen 10 is on and displays the front image.

Taking-Picture state: red LED 16 turns on. The LCD screen 10 displays the current picture taken. This is a temporal state. When it ends, the system will move to the Wait state.

Alarm state: red LED 16 blinking. The camera system received an external trigger that drove it to a special state in which the camera system does not respond to internal events. In this state, the camera system sets the front camera as output image and transmits live video out from this camera. The camera system may exit from this state when the external event is unsignaled. This guarantees that the camera system will remain in the Alarm state until the emergency has ended.

Figure 4:
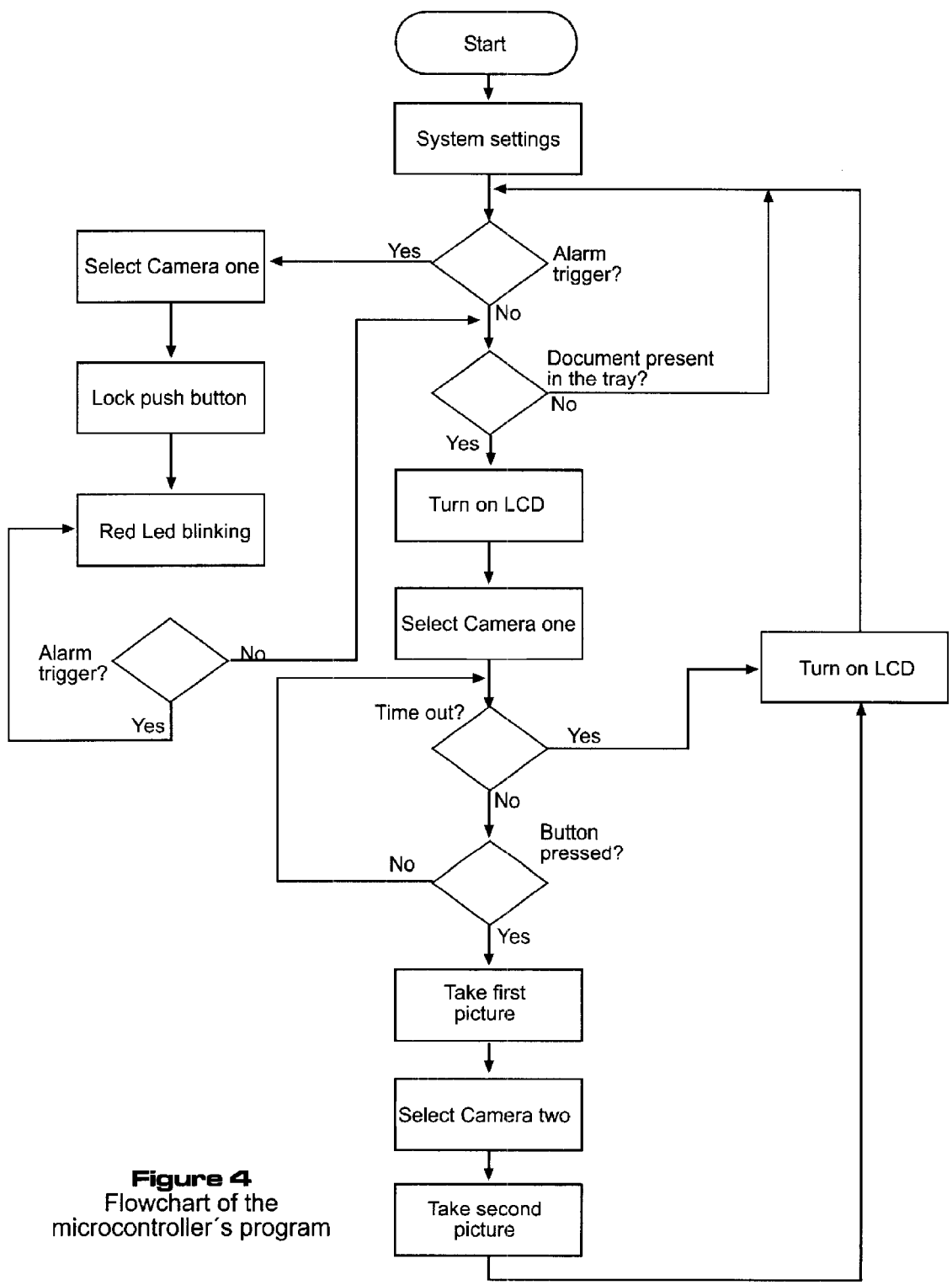
FIG. 4 is a simplified flowchart, describing the functional operation of the system. This diagram illustrates the microcontroller's algorithm and shows the relationship between system states of operation.

The diagram of FIG. 4 illustrates the interactions between these states. The camera system always starts in Wait state, and remains in this state until an event occurs. Then, the system will select the correct operation mode, depending on the type of event (i.e., internal or external). If the operator puts a document on the document tray 12, the document detector triggers an event and the system selects the Ready state (because a document in the tray means that a picture will be taken). A switch to the Taking-Picture state only occurs when the system is in the Ready state. This prevents the capture of wrong pictures.

If the trigger comes from an external source (e.g., the main security system or another alarm detector) the camera system will switch to the Alarm state, and will transmit the image from the front camera until the alarm condition is unsignaled.

CONCLUSION, RAMIFICATIONS AND SCOPE OF INVENTION

The disclosed camera system was designed thinking on banking applications because secure document transactions are common in that environment. However, its scope is not limited to this application because secure document transactions may be necessary in other applications (e.g., access control). The heart of the system is the microcontroller program and the two cameras, so the external appearance of the device is not a limitation. For use in others applications the system may have a different enclosure, structure or disposition which fulfills the needs of the required application.

An exemplary alternative application comprises a video system for room monitoring, using the photosensor as presence indicator. Events may be recorded only when somebody stands in front of the camera. Of course, this type of application requires a different enclosure, but the main components and the operation remains the same.

Another exemplary alternative application is face recognition. If the main storage device implements face recognition features, the present system may be used as main camera for this application. Using the external control (shown in the flowchart as an Alarm trigger), the external face recognition system may control the camera and select the desired image, without losing local system control.

Different system enclosures lead to different applications. The main program can support external and internal or local control. This feature increases the versatility of the system and the possibility of new applications without major changes to the system.

What is claimed is:

1. A camera system comprising:
    a structure;
    two video cameras mounted on said structure, wherein the first camera located on said structure to focus on an image at the front of said structure and said second camera located on said structure to focus on an image below said structure;
    a document tray being at the base of said structure with a marker to define the image area and having a document detection means for detecting the presence of a document so that the system may trigger a document-in-place event and switch to the next state of operation;
    a display means for displaying the front image to assist operator the correct capture of the front image;
    a processor means having four states of operation, a Wait state in which the system is waiting for external input, a Ready state in which the system is ready to take images, a Taking-Picture state in which the display means displays the image, and an Alarm state in which the system has received a trigger, does not respond to internal events and transmits image externally by using a communication means; and an indicator means for indicating the current state of the system.

2. A camera system comprising:

a structure;

two video cameras mounted on said structure, wherein the first camera located on said structure to focus on an image at the front of said structure and said second camera located on said structure to focus on an image below said structure;

a document tray being at the base of said structure with a marker to define the image area and having a document detection means for detecting the presence of a document so that the system may trigger a document-in-place event and switch to the next state of operation;

a display means for displaying the front image to assist operator the correct capture of the front image;

a processor means having the system start in a Wait state, and remains in this state until an event occurs, when an event occurs the system will select the correct operation mode, for an internal event the system will select a Ready state the system can capture an image, an external event, the system will select an alarm mode; and an indicator means for indicating the current state of the system.

* * * * *